UNITED STATES PATENT OFFICE.

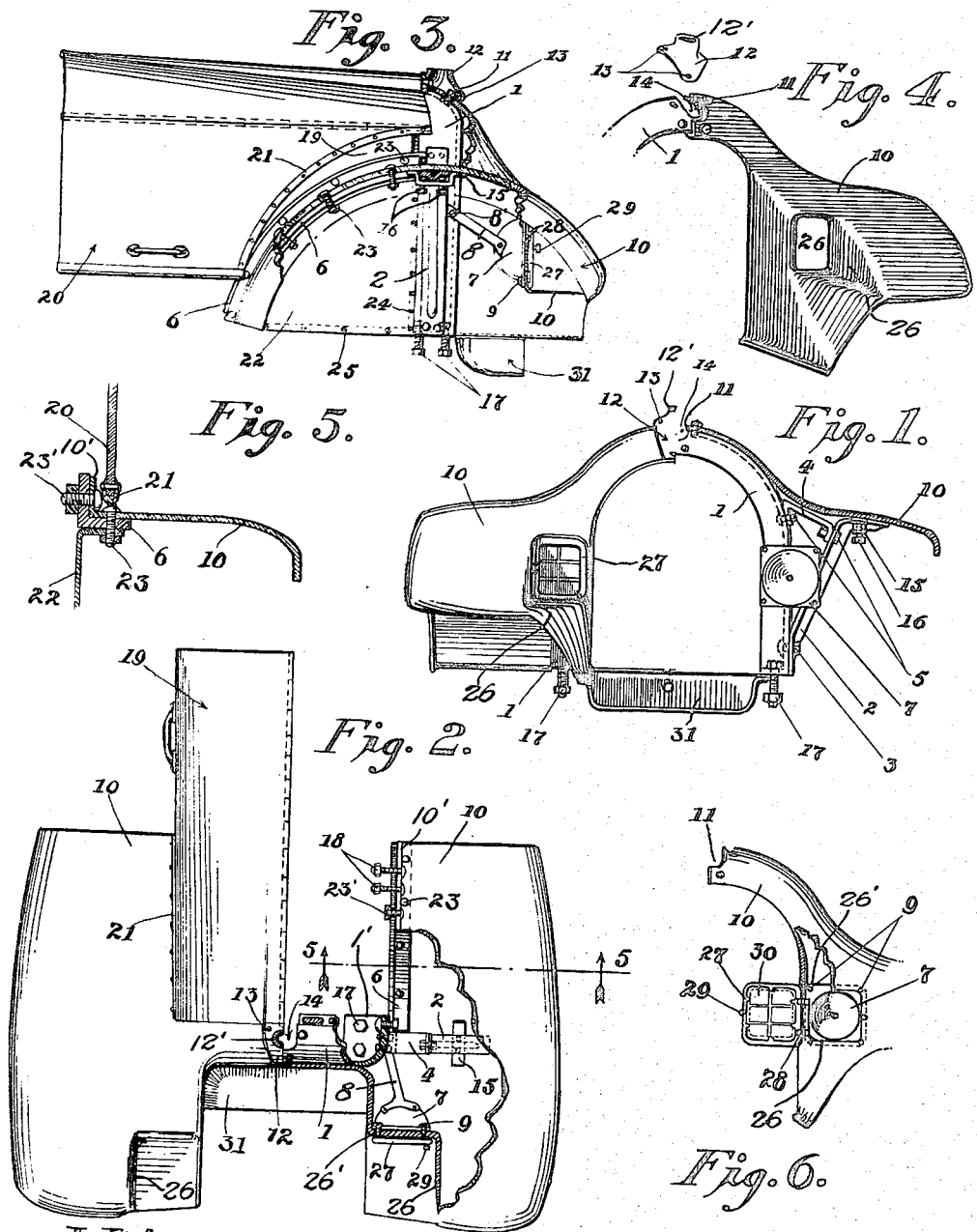

SARKIS H. SUMBULIAN, OF FRESNO, CALIFORNIA.

AUTOMOBILE FENDER.

1,422,388.  Specification of Letters Patent.  Patented July 11, 1922.

Application filed August 30, 1921. Serial No. 497,043.

*To all whom it may concern:*

Be it known that I, SARKIS H. SUMBULIAN, a citizen of the United States, residing at Fresno, in the county of Fresno, State of California, have invented certain new and useful Improvements in Automobile Fenders; and I do hereby declare the following to be a full, clear, and exact description of the invention, such as will enable others skilled in the art to which it appertains to make and use the same.

This invention relates to new and useful improvements in automobiles and particularly to mountings for fenders.

One object of the invention is to provide a novel and simple frame-work which can be quickly and easily attached to an automobile and to which the front fenders are attached.

Another object is to provide a device of this character which is formed of few parts, and such parts as can be manufactured and assembled at a comparatively low cost.

Other objects and advantages will be apparent from the following description when taken in connection with the accompanying drawing.

In the drawing:

Figure 1 is a front elevation of the fenders of an automobile, one side of which is partly in section.

Figure 2 is a top plan view of the same, partly broken away and partly in section.

Figure 3 is a side elevation partly broken away and partly in section.

Figure 4 is a perspective view of a portion of the frame work and the front portion of one of the fenders attached thereto, together with the radiator tube receiving collar.

Figure 5 is an enlarged vertical transverse sectional view on the line 5—5 of Figure 2.

Figure 6 is a fragmentary front elevation of one of the fenders showing the lamp socket with the door of the lamp box in open position.

Referring particularly to the accompanying drawing 1 represents an arched metal plate which is arcuate in cross section, and which is of the general outline of the radiator (not shown) and has a notch 14, for the reception of the filling tube of the radiator. The lower end of each leg of the arched member 1 is turned inwardly at 1', which is bolted to the side bar of the chassis, not shown. Secured to the outer face of the lower end of each leg of the member 1, and adjacent the forward edge thereof, is the lower end of an upwardly and outwardly inclined bracing arm 2, the upper end of said arm being directed horizontally outward.

An inverted angular U-shaped brace 4 is disposed between the upper end of the brace 2 and the member 1, and has its down-turned ends properly secured respectively to the brace 2 and the member 1, by means of the bolts 5.

Formed on the rear portion of each leg of the member 1, at a point rearwardly of the inner end of each brace 4, is a rearwardly and downwardly curved metal plate 6, the same being in the form of an angle bar. Secured to the lower face of the horizontal wing of each angle bar 6, is the horizontal flange of the semi-circular plate 22, and disposed on the upper face of this wing of the bar is the inner portion of the fender 10, said inner portion having an upwardly extending flange 10', which is bolted to the vertical wing of the angle bar 6, by means of the bolts 23'. The rear end of each of the angle bars 6, as well as the rear end portion of each of the guards 10, extends to and is properly connected with the front end of a running-board.

Secured to the lower face of each of the guards 10, and extending beneath the outwardly extending upper end of the brace 2, is a substantially U-shaped connecting member 15, said member serving to hold the fender or guard firmly in position on the brace 2. A clamping screw 16 is disposed through the intermediate portion of the member 15 to hold same firmly connected to the fender 10. Each fender 10 has an upwardly and transversely curved portion which is secured to the upper portion of the arched member 1 and is also notched at 11 to conform to the adjacent part of the wall of the notch 14.

Secured to the meeting end portions of the fenders 10, and over the openings 14, is a plate 12, the same having an upwardly extending tubular neck 12' through which extends the radiator filling tube. In the forward portion of each of the fenders there is formed a recess 26, the rear wall of which is formed with an opening 26', and secured to the rear face of this wall and covering the opening is the lamp casing 7, said casing being secured to said wall by means of screws 9.

A brace arm 8 is secured to the rear of the casing 7 and extends rearwardly to and is connected with the member 1, said brace 8 being secured to the brace 2 by means of the screws 8'. A door 27 is hinged to one side of the opening 26' and has the glass panels 30 therein, and a latch 29. Bolted to the lower ends of the legs of the arched member 1, by means of the bolts 17, is a downwardly and forwardly extending pan 31.

The hinged covers 20 of the hood 19 have their forward ends curved and correspond to the curve of the rear portion of the fenders, as shown at 21.

What is claimed is:

1. An automobile fender structure comprising an arched member adapted to fit over the automobile radiator, upwardly and outwardly inclined braces carried by the arched member, tie members between the braces and arched member and downwardly and rearwardly curved angle members cooperating with the braces and arched member to support the fender wings.

2. A fender supporting frame work for an automobile comprising an arched member having attaching feet on the lower ends of its legs, a notch in one edge of the bight portion, outwardly and upwardly inclined braces connected to the legs of the arched member and having their upper ends directed horizontally outward, tie members connected to the upper portions of the braces and legs of the arched member, and rearwardly and downwardly curved angle bars each having its transverse wing secured to the upper portion of a leg of the arched member and its other wing supporting a fender wing.

3. An automobile fender construction comprising a supporting frame including a radiator straddling arched member having a notch in the bight thereof, upwardly and outwardly directed supporting arms rearwardly and downwardly curved angle members, fender wings formed to rest on the supporting arms and certain wings of the curved angle members and each provided with a curved extended neck embracing a portion of the bight of the arched member, said neck having a terminal notch registering with a portion of the notch of the bight of the arched member, and a plate secured over the notched ends of the fender necks and having an upwardly extending radiator tube receiving neck.

In testimony whereof, I affix my signature, in the presence of two witnesses.

SARKIS H. SUMBULIAN.

Witnesses:
Q. KOUMARIAN,
J. KIRBY.